(12) United States Patent
Boulos et al.

(10) Patent No.: US 7,094,716 B2
(45) Date of Patent: *Aug. 22, 2006

(54) GREEN GLASS COMPOSITION

(75) Inventors: Edward Nashed Boulos, Troy, MI (US); James Victor Jones, Nashville, TN (US)

(73) Assignee: Automotive Components Holdings, LLC, Dearborn, MI (US)

( * ) Notice: Subject to any disclaimer, the term of this patent is extended or adjusted under 35 U.S.C. 154(b) by 226 days.

This patent is subject to a terminal disclaimer.

(21) Appl. No.: 10/264,964

(22) Filed: Oct. 4, 2002

(65) Prior Publication Data

US 2004/0067836 A1  Apr. 8, 2004

(51) Int. Cl.
C03C 3/087  (2006.01)
C03C 4/10  (2006.01)
C03C 4/08  (2006.01)

(52) U.S. Cl. .......... 501/70; 501/904; 501/905

(58) Field of Classification Search ........ 501/70, 501/71, 904, 905
See application file for complete search history.

(56) References Cited

U.S. PATENT DOCUMENTS

| | | |
|---|---|---|
| 1,961,603 A | 6/1934 | Berger et al. |
| 2,505,001 A | 4/1950 | Nordberg |
| 3,343,935 A | 9/1967 | Keefer et al. |
| 3,345,190 A | 10/1967 | Albinak et al. |
| 3,486,874 A | 12/1969 | Rough |
| 3,578,430 A | 5/1971 | Labrot |
| 3,779,733 A | 12/1973 | Janakirama-Rao |
| 3,951,635 A | 4/1976 | Rough, Sr. |
| 3,971,646 A | 7/1976 | Rhodes |
| 4,104,076 A | 8/1978 | Pons |
| 4,381,934 A | 5/1983 | Kunkle et al. |
| 4,493,557 A | 1/1985 | Nayak et al. |
| 4,519,814 A | 5/1985 | Demarest, Jr. |
| 4,529,428 A | 7/1985 | Groetzinger |
| 4,539,034 A | 9/1985 | Hanneken |
| 4,610,711 A | 9/1986 | Matesa et al. |
| 4,701,425 A | 10/1987 | Baker et al. |
| 4,738,938 A | 4/1988 | Kunkle et al. |
| 4,792,536 A | 12/1988 | Pecoraro et al. |
| 4,866,010 A | 9/1989 | Boulos et al. |
| 5,013,487 A | 5/1991 | Cheng |
| 5,077,133 A | 12/1991 | Cheng |
| 5,112,778 A | 5/1992 | Cheng et al. |
| 5,214,008 A | 5/1993 | Beckwith et al. |
| 5,240,886 A | 8/1993 | Gulotta et al. |
| 5,308,805 A | 5/1994 | Baker et al. |
| 5,318,931 A | 6/1994 | Nakaguchi et al. |
| 5,320,986 A | 6/1994 | Taniguchi et al. |
| 5,344,798 A | 9/1994 | Morimoto et al. |
| 5,346,867 A | 9/1994 | Jones et al. |
| 5,352,640 A | 10/1994 | Combes et al. |
| 5,362,689 A | 11/1994 | Morimoto et al. |
| 5,385,872 A | 1/1995 | Gulotta et al. |
| 5,393,593 A | 2/1995 | Gulotta et al. |
| 5,411,922 A | 5/1995 | Jones |
| 5,478,783 A | 12/1995 | Higby et al. |
| 5,521,128 A | 5/1996 | Jones et al. |
| 5,523,263 A | 6/1996 | Penrod |
| 5,558,942 A | 9/1996 | Itoh et al. |
| 5,582,455 A | 12/1996 | Casariego et al. |
| 5,593,929 A | 1/1997 | Krumwiede et al. |
| 5,610,107 A | 3/1997 | Danielson et al. |
| 5,641,716 A | 6/1997 | Higby et al. |
| 5,688,727 A | 11/1997 | Shelestak et al. |
| 5,700,579 A | 12/1997 | Jeanvoine et al. |
| 5,723,390 A | 3/1998 | Kijima et al. |
| 5,726,109 A | 3/1998 | Ito et al. |
| 5,747,398 A | 5/1998 | Higby et al. |
| 5,776,845 A | 7/1998 | Boulos et al. |
| 5,776,846 A | 7/1998 | Sakaguchi et al. |
| 5,780,372 A | 7/1998 | Higby |
| 5,807,417 A * | 9/1998 | Boulos et al. ............ 65/134.3 |
| 5,830,812 A | 11/1998 | Shelestak et al. |
| 5,851,940 A * | 12/1998 | Boulos et al. ............ 501/71 |
| 5,858,894 A | 1/1999 | Nagashima et al. |
| 5,877,102 A | 3/1999 | Dupont et al. |

(Continued)

FOREIGN PATENT DOCUMENTS

EP  0 555 552 A1  8/1993

(Continued)

OTHER PUBLICATIONS

Derwent Abstract 2003-170892 of JP 2002-348143 A.*

(Continued)

Primary Examiner—David Sample
Assistant Examiner—Eliabeth A Bolden
(74) Attorney, Agent, or Firm—MacMillan, Sobanski & Todd, LLC

(57) ABSTRACT

The present invention is a green soda-lime-silica glass composition. The composition comprises 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%, and colorants comprising: 0.3 to 0.8 wt. % total iron as $Fe_2O_3$ wherein the ratio of FeO/total Fe as $Fe_2O_3$ is 0.35 to 0.62; 0.05 to 0.5 wt. % manganese compound as $MnO_2$; 0 to 0.1 wt. % titanium oxide as $TiO_2$; and 0 to 1 wt. % cerium oxide as $CeO_2$. The colored glass has the following spectral properties at 4.0 mm. thickness: 65 to 81% light transmittance using Illuminant A (LTA) and using Illuminant C has a dominant wavelength of 494 to 555 nanometers with an excitation purity of 2 to 9%.

12 Claims, 2 Drawing Sheets

U.S. PATENT DOCUMENTS

| | | | |
|---|---|---|---|
| 5,877,103 | A | 3/1999 | Dupont et al. |
| 5,888,917 | A | 3/1999 | Kawaguchi et al. |
| 5,897,956 | A | 4/1999 | Kijima et al. |
| 5,908,794 | A | 6/1999 | Maeda et al. |
| 5,932,502 | A | 8/1999 | Longobardo et al. |
| 5,952,255 | A | 9/1999 | Seto et al. |
| 5,977,002 | A | 11/1999 | Boulos et al. |
| 5,985,780 | A | 11/1999 | Casariego et al. |
| 6,017,837 | A | 1/2000 | Nagashima et al. |
| 6,046,122 | A | 4/2000 | Nagashima et al. |
| 6,071,840 | A | 6/2000 | Sasage et al. |
| 6,103,650 | A | 8/2000 | Krumwiede |
| 6,150,028 | A | 11/2000 | Mazon |
| 6,218,323 | B1 | 4/2001 | Bretschneider et al. |
| RE37,328 | E | 8/2001 | Pecoraro et al. |
| 6,313,052 | B1 | 11/2001 | Nakashima et al. |
| 6,313,053 | B1 | 11/2001 | Shelestak |
| 6,596,660 | B1 * | 7/2003 | Boulos et al. ............ 501/70 |
| 6,624,102 | B1 * | 9/2003 | Seto et al. ............ 501/71 |
| 6,821,918 | B1 * | 11/2004 | Boulos et al. ............ 501/70 |
| 2001/0018393 | A1 | 8/2001 | Nagashima et al. |
| 2001/0021685 | A1 | 9/2001 | Sakaguchi et al. |
| 2001/0034295 | A1 | 10/2001 | Seto et al. |
| 2002/0025899 | A1 | 2/2002 | Higby et al. |
| 2002/0058579 | A1* | 5/2002 | Seto et al. ............ 501/71 |

FOREIGN PATENT DOCUMENTS

| | | |
|---|---|---|
| EP | 677492 A1 * | 10/1995 |
| EP | 0 527 487 B1 | 11/1996 |
| EP | 0 996 598 B1 | 4/2001 |
| JP | 60-215546 | 10/1985 |
| JP | 61-136936 | 6/1986 |
| JP | 2002348143 A * | 12/2002 |
| WO | WO 95/16641 | 6/1995 |

OTHER PUBLICATIONS

Glass Science and Technology, 2-Colour Generation and Control in Glass, by C.R. Bamford, Elsevier Scientific Publishing Company Amsterdam-Oxford-New York 1977; pp. 35, 36 78, 79, 106, 107, 108, 109, 142, 143, 144, 145, 146.

Journal of the Society of Glass Technology—XXIV. The Colour of Iron-Containing Glasses of Varying Composition, By Gordon F. Brewster and Norbert J. Kreidl (Bausch and Lomb Optical Co., Rochester, New York)—pp. 332-371 (pp. 372-373 missing) and continues from pp. 474-405.

Journal of the Optical Society of America—vol. 38, No. 6, Jun. 1948 Entitled "Color Variations in Glasses Containing Iron" by John W. Forrest, Norbert J. Freidl and Tyler G. Pett, Bausch and Lomb Optical Company, Rochester 2, New York (Received Jan. 12, 1948)—pp. 554-560.

Coloured Glasses, By Woldemar A. Weyl, Published By the Society of Glass Technology "Elmfield" Northumberland Road, Sheffield, IO 1951- Chapter VII, the Colours Produced by Iron; pp. 90-120; Chapter XVII, the Colours Produced by Sulphur and Its Compounds, pp. 238-281.

* cited by examiner

GREEN GLASS COMPOSITION

TECHNICAL FIELD OF THE INVENTION

The invention is directed to a green glass composition having a high redox ratio and method of producing the green glass.

BACKGROUND OF THE INVENTION

It would be extremely advantageous to improve the infrared absorption of glass products while maintaining a high level of visible transmission and to also have a good absorption in the ultraviolet portion of the spectrum. Iron oxide exists in two chemical forms in the glass, an oxidized form which is yellow, $Fe_2O_3$, and a reduced form which is blue FeO. Advantageously, the oxidized form of iron oxide absorbs a portion of the ultraviolet light passing through the glass product and the reduced form of iron oxide absorbs a portion of the infrared light passing through the glass product. Under typical furnace firing conditions and batching conditions, when the total iron oxide in the glass product is within the range of about 0.3 to 1.2 wt. % as $Fe_2O_3$, the iron oxide equilibrium is such that the redox ratio of FeO/total Fe as $Fe_2O_3$ is about 0.23–0.26.

It is desirable to increase the proportion of reduced iron oxide (FeO) in the glass to improve its infrared absorption. In addition, by shifting the iron oxide away from the oxidized form ($Fe_2O_3$) the glass will change color from green to blue. It would be further desirable to shift the blue glass back to a green color and to simultaneously improve the ultra violet absorption as well as the infrared absorption.

One way commonly employed to shift the redox equilibrium of iron oxide in the glass, and hence its UV and IR properties, is by increasing the fuel to the furnace. Increasing the amount of fuel, however, has several undesirable consequences: the combustion heating of the furnace becomes inefficient and requires an air increase or the unburnt fuel will burn in the checker system of the furnace. Excess fuel can also reduce the glass to an amber color that sharply lowers the visible transmittance of the glass product.

An amber color arises when the iron reacts with sulfur that has been reduced to form iron sulfide. Amber colored glass containers are normally melted in like manner by using anthracite coal together with iron oxide and sulfate. The amber iron sulfide chromophore, once produced, significantly decreases the visible transmittance of the glass and the glass could not be used where a high transmittance is required.

Therefore, there is a need in the glass industry to produce amber free green glass that has high transmittance yet having an improved infrared light absorption and an ultra violet absorption.

SUMMARY OF THE INVENTION

In one aspect of the present invention a green soda-lime-silica glass having a base and a colorant is provided. The composition of the base comprises 68 to 75% $SiO_2$, 10 to 18 wt. % $Na_2O$, 5 to 15 wt. % CaO, 0 to 10 wt. % MgO, 0 to 5 wt. % $Al_2O_3$, and 0 to 5 wt. % $K_2O$, where CaO+MgO is 6 to 15 wt. % and $Na_2O+K_2O$ is 10 to 20 wt. % is provided. The composition of the colorants comprises: 0.3 to 0.65 wt. % total iron as $Fe_2O_3$; wherein the ratio of FeO/total Fe as $Fe_2O_3$ is greater than 0.37 but less than 0.65; 0.05 to 0.8 wt. % manganese compound as $MnO_2$.

In yet another aspect of the invention a sufficient amount of reductant is added to the batch to achieve a redox ratio of greater than 0.37. In yet another aspect of the present invention glass products made according to the embodiment of the invention have the following spectral properties at 4.0 mm. thickness: 65 to 81% light transmittance using Illuminant A (LTA) and using Illuminant C has a dominant wavelength greater than 494 but less than or equal to 555 nanometers with an excitation purity greater than 2% and less than 9%. Generally, as the quantities of the colorants increase, both the % LTA and % IR transmittance will go down. Similarly, as the glass thickness increases for a given glass composition, the transmittance of the thicker glass will decrease.

In yet another aspect of the present invention a method of producing a green glass having the above composition is disclosed where the glass has an improved infrared light absorption while maintaining a good visible transmission and, at the same time, achieving good absorption in the ultra violet portion of the spectrum.

BRIEF DESCRIPTION OF THE DRAWINGS

Further features and advantages of the invention will become apparent from the following discussion and the accompanying drawings in which.

DETAILED DESCRIPTION OF THE PREFERRED EMBODIMENT

Figure 1:
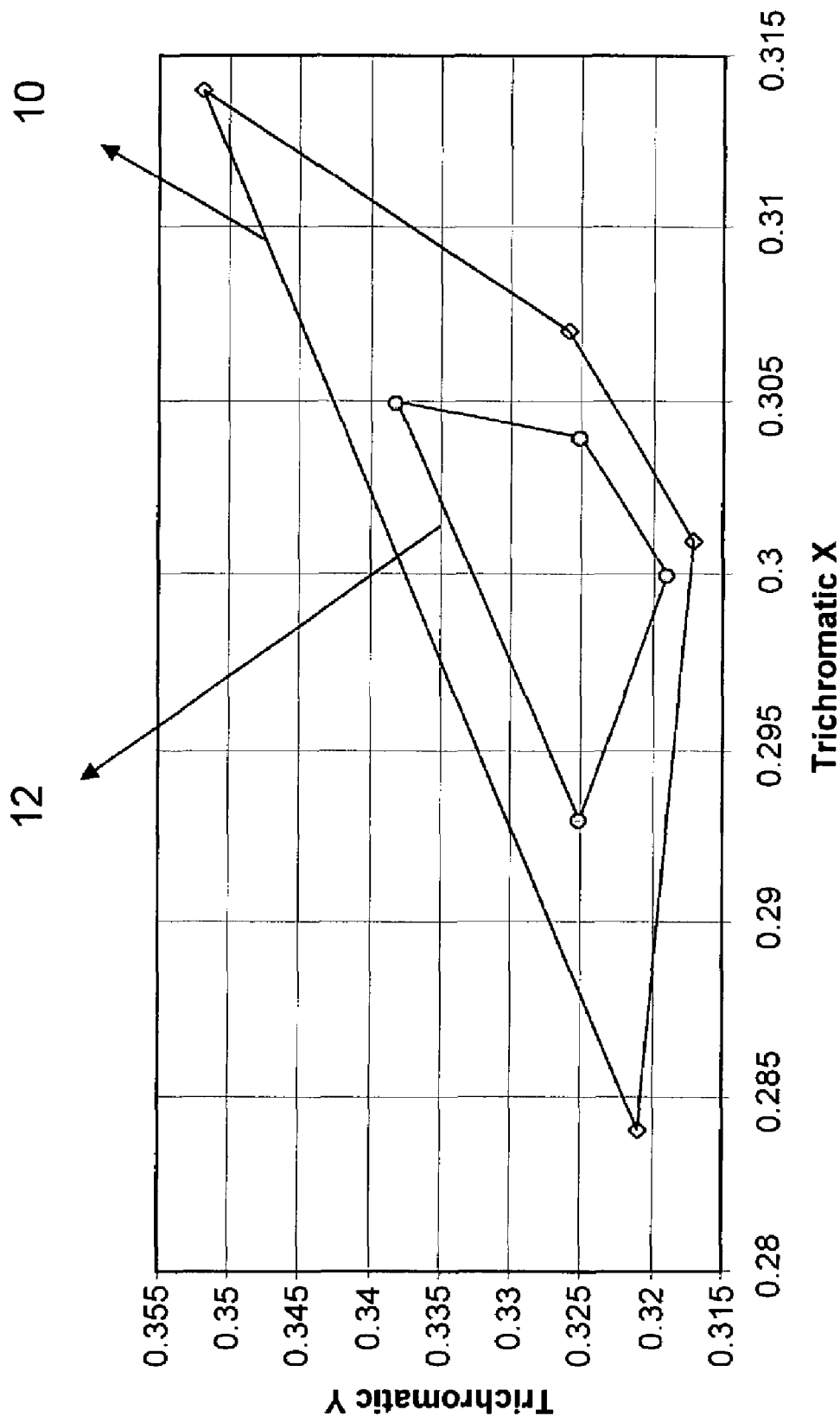
FIG. 1 is a graphical representation of the chromaticity coordinates of the glass of the present invention.

Flat soda-lime-silica glass, used in the automotive and architectural industries and conveniently made by the float glass process, is generally characterized by the following basic composition, the amounts of the components being based on a weight percentage of the total glass composition:

TABLE I

| Base Glass Components | Weight % |
| --- | --- |
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The green glass composition of the present invention employs this basic soda-lime-silica glass composition wherein, additionally, CaO+MgO is 6 to 15 wt. % and $Na_2O+K_2O$ is 10 to 20 wt. %. Preferably, $SO_3$ is present in the range of 0.03 to 0.20 wt. %, more preferably 0.03 to 0.10 wt. %. In addition, the green glass composition consists essentially of the following coloring components: iron oxide; manganese compound; and optionally one of titanium dioxide or cerium oxide or both.

The total iron as $Fe_2O_3$ is present in the invention composition in quantities of 0.3 to 0.65 wt. % $Fe_2O_3$. Typically, this ingredient is added with the batch ingredients in the oxide form, i.e. $Fe_2O_3$. The iron oxide incorporated in the composition lowers both the ultraviolet and the infrared transmittance of the glass products. When iron oxide is used in a glass composition in normal commercial production, the redox ratio defined as equal to FeO/total iron (Fe) as $Fe_2O_3$ In commercial glass products available today this redox ratio is in the range of is 0.23–0.26. On the other hand, the glass of the present invention has a higher redox ratio, in the range of 0.37–0.65. If the redox ratio goes above 0.65, the undesirable amber chromophore may form.

The glass of the invention is manufactured by one step batch admixing of the components to feed a conventional Siemens float glass furnace. Sodium sulfate is mixed in the batch together with anthracite coal to shift the iron oxide equilibrium toward the reduced form of iron (FeO). Manganese dioxide is necessary in the batch to prevent the formation of the amber iron sulfide. All of the batch components are mixed together in a single step and then metered into the furnace. In glass product made with this method titanium or cerium oxide improves the ultra violet absorption of the glass. When glass products made in this manner are used in vehicles, the green glass absorbs solar heat and there is relatively less total heat build up in the vehicle. The load on vehicle air conditioners is reduced such that there is less heat build up to cool and comfort to the passengers occurs quickly. Glass made with the instant invention can also be used for architectural products and provides a similar reduction in air conditioner load.

A manganese compound is present in an amount of 0.05 to 0.80 wt. % based on $MnO_2$ in the green glass invention composition to prevent the formation of the amber color. This manganese compound can be added to the batch glass components in a variety forms, e.g., but not limited to $MnO_2$, $Mn_3O_4$, $MnO$, $MnCO_3$, $MnSO_4$, $MnF_2$, $MnCl_2$, etc.

Table II discloses the amounts of raw material batch ingredients that are preferably used to form the embodiments of green glass compositions according to the present invention.

TABLE II

| Batch Material | Range Mass (Lbs) |
|---|---|
| Sand | 1000 |
| Soda Ash | 290 to 350 |
| Limestone | 70 to 90 |
| Dolomite | 215 to 260 |
| Salt cake | 5 to 15 |
| Rouge (97% $Fe_2O_3$) | 3.5 to 8.5 |
| Manganese Dioxide | 0.65 to 11.0 |
| Titanium Dioxide | 0 to 14.0 |
| Cerium Oxide | 0 to 14.0 |
| Anthracite coal | 9 to 2.5 |
| Nepheline Syenite | 0 to 150 |

The anthracite coal is preferably bought under the tradename CARBOCITE and is commercially available from the Shamokin Filler Company. Graphite could be used as a substitute for anthracite coal in an amount of about 70% that of anthracite coal because anthracite coal contains about 70–72% carbon. If graphite is used, the typical range would be from 0.7 to 2.1 pounds of graphite per 1000 pounds of sand. MELITE, a coal slag processed by Calumite Corporation could partially or wholly substitute for rouge in the batch up to about 55 pounds Melite per 1000 pounds of sand. MELITE has about 80% of the total iron oxide in the reduced form and thus would require less anthracite coal to generate similar spectral properties.

The equilibrium reactions that occur in the glass melt which causes, in the forms of iron oxide are included by the sodium sulfate used as a refining agent and carbon used to react with sodium sulfate at lower furnace temperatures. Generally, increasing the quantity of sodium sulfate in the glass tends to shift the iron oxide equilibrium slightly toward oxidizing, on the other hand, increasing carbon concentration in the glass batch shifts the iron oxide equilibrium toward reducing form of iron. Another influence on the iron oxide equilibrium is the peak furnace temperature which, when increased will shift the iron oxide slightly toward the reduced state and lowering overall furnace temperature allows the iron oxide to shift back towards the oxidized state, thereby obtaining the green color of the present invention.

As illustrated in FIG. 1, the color of the colored glass is defined by the defined by a chromaticity coordinates inside the polygons ABCDA, the chromaticity coordinates are:

| | x | y |
|---|---|---|
| A | 0.284 | 0.321 |
| B | 0.301 | 0.317 |
| C | 0.307 | 0.326 |
| D | 0.314 | 0.352 |

The smaller polygon as shown by reference numeral 12 represents the preferred color space while the larger polygon as shown by reference numeral 10 represents the full scope of the color space of the invention. The colored glass obtained in accordance with the teachings of the present invention exhibits the following spectral properties at 4 mm. control thickness has a light transmittance using illuminant A in a range of 65% to 81%, an infrared transmittance in the range of 10% to 33% and an ultraviolet transmittance in the range of 38% to 60%.

Melts were made in the laboratory which demonstrate embodiments of this invention using the procedure as follows: batches were weighed, placed into a glass jar about 2" high and 2" inside diameter and dry mixed for 10 minutes each on a Turbula mixer, dry batch was placed into an 80% platinum/20% rhodium crucible that stands 2" tall and has an inside diameter at the top of 2.5" and is tapered to the base which has an inside diameter of 1.75". An amount of 4.5 ml. of water is added to the dry batch in the crucible and mixed with a metal spoon. After such preparation, a group of six different batches is melted in a gas/air fired surface at the same time for 1 hour at 2600° F. and each crucible is removed in turn from the furnace and fritted. Fritting the glass involves coating the inside of the platinum/rhodium crucible by rolling the molten glass around the inside of the crucible and then plunging the crucible into cold water. After removing the crucible from the water and draining, the broken glass particles are removed from the sides of the crucible and mechanically mixed inside the crucible. All six samples are fritted in like manner and all crucibles are placed back into the furnace for another hour interval at 2600° F. and the fritting procedure is repeated. After the second fritting process, the crucibles are returned to the furnace for 4 hours at 2600° F. Each crucible is removed in turn from the furnace and each molten glass sample is poured into a graphite mold with an inside diameter of 2.5". Each glass is cooled slowly, labeled, and placed into an annealing furnace where the temperature is quickly raised to 1050° F., held for 2 hours, and then slowly cooled by shutting off the furnace and removing the samples after 14 or more hours. The samples are ground and polished to about 4.0 mm. thickness and subsequently the spectral properties are measured for each sample.

All laboratory melts made with above procedure use a base composition of 100 grams sand, 32.22 grams soda ash, 8.81 grams limestone, 23.09 grams dolomite, 0.5 to 2.0 grams of sodium sulfate, 0.09 to 0.25 grams of CARBOCITE, 2.64 grams of nepheline syenite, and the remainder of the batch includes rouge, manganese dioxide, and titanium dioxide and cerium oxide, if required.

In each of the following tables of examples with the glass composition includes spectral data at 4.0 mm, which is the control thickness. Some tables include thickness other than 4.0 mm. where the most preferred embodiment of the instant invention is with the % LTA greater than or equal to 70% and the TSET is less than or equal to 40%.

Table III below shows the improvement to infrared absorption by increasing anthracite coal and improvement in ultra violet absorption by increasing manganese dioxide ($MnO_2$) at constant $Fe_2O_3$. Generally, as the amount of anthracite coal is increased, the infrared absorption increases. On the other hand as the amount of manganese dioxide is increased the ultra violet absorption increases. Glasses made with the same batch concentrations, but without anthracite coal are green and do not have the level of infrared absorption; this would put those glasses outside the scope of this invention. Glasses made without manganese dioxide could develop the amber color and the transmittance is significantly lower.

TABLE III

| | Example | | | | | | | |
|---|---|---|---|---|---|---|---|---|
| | 1 | 2 | 3 | 4 | 5 | 6 | 7 | 8 |
| Wt. % $Fe_2O_3$ | 0.5 | 0.5 | 0.5 | 0.5 | 0.5 | 0.5 | 0.5 | 0.5 |
| Wt. % FeO | 0.293 | 0.308 | 0.305 | 0.296 | 0.298 | 0.299 | 0.19 | 0.203 |
| Redox Ratio | 0.586 | 0.616 | 0.610 | 0.592 | 0.596 | 0.598 | 0.380 | 0.406 |
| Wt. % $MnO_2$ | 0.05 | 0.1 | 0.15 | 0.15 | 0.2 | 0.4 | 0.8 | 0.8 |
| Salt Cake* | 10 | 7.5 | 5 | 10.04 | 10 | 10.5 | 10 | 10 |
| Anthracite coal* | 2.087 | 1.816 | 2 | 2.004 | 2.086 | 2.33 | 1.908 | 2.083 |
| Spectral Properties @ 4.0 mm. control thickness | | | | | | | | |
| % LTA | 71.54 | 68.93 | 68.83 | 70.04 | 70.39 | 70.21 | 75.14 | 75.53 |
| % UV | 56.16 | 47.81 | 48.77 | 51.9 | 52.89 | 42.58 | 47.84 | 50.87 |
| % IR | 15.13 | 13.92 | 14.16 | 14.88 | 14.74 | 14.57 | 27.61 | 25.61 |
| % TSET | 40.62 | 37.74 | 38.07 | 39.34 | 39.57 | 39.21 | 48.9 | 48.2 |
| Dominant Wavelength | 494.2 | 516.6 | 509.7 | 500.3 | 497.9 | 495.8 | 498.5 | 494.8 |
| % Excitation Purity | 6 | 3.5 | 3.4 | 4.4 | 4.9 | 5.7 | 3.4 | 4.4 |
| Chromaticity Coor. x | 0.29316 | 0.3011 | 0.2999 | 0.29674 | 0.29538 | 0.29358 | 0.29999 | 0.29764 |
| Chromaticity Coor. y | 0.32094 | 0.33382 | 0.33103 | 0.32641 | 0.32467 | 0.32289 | 0.32252 | 0.32026 |
| Most Preferred Embodiment of Invention Spectral Properties @ indicated thickness | | | | | | | | |
| Thickness in mm. | 4.2 | 3.7 | 3.7 | | | | | |
| % LTA | 70.7 | 70.3 | 70.3 | | | | | |
| % UV | 55.2 | 49.8 | 50.7 | | | | | |
| % IR | 14.4 | 15.9 | 16.1 | | | | | |
| % TSET | 39.5 | 39.7 | 39.8 | | | | | |
| Dominant Wavelength | 494.2 | 516.6 | 509.7 | | | | | |
| % Excitation Purity | 6.3 | 3.1 | 3.2 | | | | | |

*pounds per 1000 pounds sand

Table IV demonstrates that increasing the iron oxide lowers the transmittance in the visible portion of the spectrum and that the infrared transmittance is lowered as well. Further improvements in ultra violet absorption are observed when $MnO_2$ is increased.

TABLE IV

| | Example | | | | |
|---|---|---|---|---|---|
| | 9 | 10 | 11 | 12 | 13 |
| Wt. % $Fe_2O_3$ | 0.35 | 0.4 | 0.45 | 0.55 | 0.6 |
| Wt. % FeO | 0.212 | 0.244 | 0.26 | 0.358 | 0.358 |
| Redox Ratio | 0.606 | 0.610 | 0.578 | 0.651 | 0.597 |
| Wt. % $MnO_2$ | 0.1 | 0.1 | 0.1 | 0.45 | 0.45 |
| Salt Cake* | 10 | 10 | 10 | 10 | 10 |
| anthracite coal* | 2 | 2.003 | 2.005 | 2.224 | 2.225 |
| Spectral Properties @ 4.0 mm. control thickness | | | | | |
| % LTA | 75.29 | 73.21 | 73.75 | 67.36 | 66.91 |
| % UV | 57.96 | 55.71 | 58.57 | 50.57 | 47.87 |
| % IR | 24.42 | 20.19 | 18.4 | 10.47 | 10.52 |
| % TSET | 47.2 | 43.85 | 43.59 | 35.86 | 35.54 |
| Dominant Wavelength | 508.4 | 504.2 | 494.2 | 494.5 | 495.6 |
| % Excitation | 2.5 | 3.2 | 5.1 | 7 | 6.7 |
| Purity Chromaticity Coor. x | 0.30259 | 0.30024 | 0.29564 | 0.29009 | 0.29083 |
| Chromaticity Coor. y | 0.32641 | 0.32661 | 0.32026 | 0.32229 | 0.32365 |
| Most Preferred Embodiment of Invention Spectral Properties @ indicated thickness | | | | | |
| Thickness in mm. | 5.5 | 4.8 | 4.8 | 3.4 | 3.4 |
| % LTA | 70.1 | 70.07 | 70.7 | 70.46 | 70.05 |
| % UV | 50.7 | 51.5 | 54.81 | 54.24 | 51.72 |
| % IR | 15.6 | 15.19 | 13.62 | 14.19 | 14.25 |
| % TSET | 39.5 | 39.41 | 39.36 | 39.53 | 39.26 |
| Dominant Wavelength | 508.3 | 504.2 | 494.2 | 494.5 | 495.6 |

TABLE IV-continued

| | Example | | | | |
|---|---|---|---|---|---|
| | 9 | 10 | 11 | 12 | 13 |
| % Excitation Purity | 3.4 | 3.8 | 6.1 | 6 | 5.7 | pounds per 1000 pounds sand

Table V shows that the ultra violet absorption can be improved by the addition of cerium oxide to the batch mixture of iron oxide, manganese dioxide, salt cake and anthracite coal that contains about 70 to 72% carbon as the active reducing material. Increasing the cerium oxide helps to oxidize the iron oxide and that increases the transmittance in the visible portion of the spectrum and that is critical when the finished glass product is to be used in automotive applications.

TABLE V

| Example | 14 | 15 | 16 |
|---|---|---|---|
| Wt. % $Fe_2O_3$ | 0.5 | 0.5 | 0.5 |
| Wt. % FeO | 0.322 | 0.299 | 0.303 |
| Redox Ratio | 0.644 | 0.598 | 0.606 |
| Wt. % $MnO_2$ | 0.3 | 0.05 | 0.2 |
| Wt. % $CeO_2$ | 0.1 | 0.2 | 0.5 |
| Salt Cake* | 10.5 | 10 | 10.5 |
| Anthracite Coal* | 1.752 | 2 | 2.334 |
| Spectral Properties @ 4.0 mm. control thickness | | | |
| % LTA | 66.73 | 70.56 | 69.43 |
| % UV | 41.31 | 47.56 | 39.69 |
| % IR | 12.88 | 14.66 | 14.26 |
| % TSET | 36.01 | 39.51 | 38.13 |
| Dominant Wavelength | 516.5 | 496.6 | 508.2 |
| % Excitation Purity | 3.6 | 5.3 | 3.5 |
| Chromaticity Coor. x | 0.30056 | 0.29457 | 0.29924 |
| Chromaticity Coor y | 0.33475 | 0.32356 | 0.33083 |
| Most Preferred Spectral Properties @ indicated thickness | | | |
| Thickness in mm. | | | 3.85 |
| % LTA | | | 70.14 |
| % UV | | | 40.51 |
| % IR | | | 15.22 |
| % TSET | | | 39.04 |
| Dominant Wavelength | | | 508.2 |
| % Excitation Purity | | | 3.5 |

*pounds per 1000 pounds sand

Table VI below indicates the impact of titanium dioxide on glass compositions to improve the ultra violet absorption of the glass composition while the concentration of iron oxide and manganese dioxide are kept constant. Table VI also demonstrates the impact from a small increase in the reductant, anthracite coal. Example 19 has essentially the same composition as Example 18 but with the anthracite coal increased from 2.0 to 2.2 pounds per 1000 pounds sand and as seen all of the spectral properties are lowered. Example 21 shows the same effect compared to that of Example 20 as the anthracite coal is increased from 2.0 to 2.2 pounds per 1000 pounds of sand. Examples 18, 20, 22 and 23 clearly show the improvement in ultra violet absorption when all other components of the composition are constant.

TABLE VI

| | Example | | | | | | |
|---|---|---|---|---|---|---|---|
| | 17 | 18 | 19 | 20 | 21 | 22 | 23 |
| Wt. % $Fe_2O_3$ | 0.45 | 0.45 | 0.45 | 0.45 | 0.45 | 0.45 | 0.45 |
| Wt. % FeO | 0.277 | 0.26 | 0.279 | 0.246 | 0.283 | 0.258 | 0.263 |
| Redox Ratio | 0.616 | 0.578 | 0.620 | 0.547 | 0.629 | 0.573 | 0.584 |
| Wt. % $MnO_2$ | 0.15 | 0.15 | 0.15 | 0.15 | 0.15 | 0.15 | 0.15 |
| Wt. % $TiO_2$ | 0.1 | 0.2 | 0.2 | 0.4 | 0.4 | 0.5 | 0.6 |
| Salt Cake* | 10.07 | 10 | 10.02 | 10 | 10.003 | 10.02 | 10.05 |
| Anthracite coal* | 2.206 | 2.003 | 2.2 | 2.004 | 2.2 | 2.004 | 2.004 |
| Spectral Properties @ 4.0 mm. control thickness | | | | | | | |
| % LTA | 70.25 | 73.23 | 68.66 | 73.75 | 68.16 | 71.75 | 70.95 |
| % UV | 47.7 | 54.82 | 40.79 | 51.91 | 39.4 | 48.38 | 44.72 |
| % IR | 16.62 | 18.31 | 16.41 | 19.88 | 16.01 | 18.53 | 17.97 |
| % TSET | 39.84 | 43.13 | 38.2 | 44.17 | 37.84 | 42.23 | 41.19 |
| Dominant Wavelength | 528.7 | 494.7 | 554.2 | 494.9 | 551.6 | 498.9 | 507.7 |
| % Excitation Purity | 3.7 | 5.2 | 8.4 | 4.9 | 7.6 | 4.1 | 3.1 |
| Chromaticity Coor. x | 0.304 | 0.2951 | 0.3119 | 0.2960 | 0.3103 | 0.2978 | 0.3006 |
| Chromaticity Coor. y | 0.3345 | 0.321 | 0.3456 | 0.3209 | 0.3439 | 0.3242 | 0.3286 |

TABLE VI-continued

| | Example | | | | | | |
|---|---|---|---|---|---|---|---|
| | 17 | 18 | 19 | 20 | 21 | 22 | 23 |
| Most Preferred Embodiment of Invention Spectral Properties @ indicated thickness | | | | | | | |
| Thickness in mm. | | 4.8 | | 4.8 | | 4.4 | 4.2 |
| % LTA | | 70.12 | | 70.7 | | 70.1 | 70 |
| % UV | | 50.73 | | 47.64 | | 46.1 | 43.4 |
| % IR | | 13.55 | | 14.91 | | 16.13 | 16.8 |
| % TSET | | 38.86 | | 39.83 | | 40 | 39.8 |
| Dominant Wavelength | | 494.7 | | 494.9 | | 498.9 | 507.7 |
| % Excitation Purity | | 6.2 | 5.8 | 4.5 | 3.2 | | |

*pounds per 1000 pounds sand

Table VII indicates the improvements that titanium dioxide makes to glass compositions of the instant invention. Titanium dioxide has been shown to be effective in improving the ultra violet absorption but it is also shown in Table VII to increase the dominant wavelength. The dominant wavelength and excitation purity are important because they define the color of the glass. Products that follow the teachings of the instant invention can vary in thickness from 1.5 to about 8.0 mm. and can be used in architectural as well as automotive applications. Automotive applications include laminated products such as windshields.

TABLE VII

| | Example | | | | | | | |
|---|---|---|---|---|---|---|---|---|
| | 24 | 25 | 26 | 27 | 28 | 29 | 30 | 31 |
| Wt. % $Fe_2O_3$ | 0.5 | 0.5 | 0.5 | 0.5 | 0.5 | 0.5 | 0.5 | 0.5 |
| Wt. % FeO | 0.295 | 0.201 | 0.304 | 0.299 | 0.247 | 0.297 | 0.293 | 0.233 |
| Redox Ratio | 0.590 | 0.402 | 0.608 | 0.598 | 0.494 | 0.594 | 0.586 | 0.466 |
| Wt. % $MnO_2$ | 0.05 | 0.2 | 0.3 | 0.2 | 0.2 | 0.15 | 0.45 | 0.2 |
| Wt. % $TiO_2$ | 0.1 | 0.2 | 0.3 | 0.3 | 0.4 | 0.4 | 0.4 | 0.8 |
| Salt Cake* | 10 | 10 | 10.5 | 10.5 | 10 | 10 | 10 | 10 |
| anthracite coal* | 2 | 1.905 | 2.1 | 2.105 | 1.905 | 2.203 | 2.222 | 1.903 |
| Spectral Properties @ 4.0 mm. control thickness | | | | | | | | |
| % LTA | 70.96 | 75.93 | 68.74 | 69.29 | 73.49 | 69.56 | 69.57 | 73.1 |
| % UV | 53 | 41.68 | 43.66 | 44.6 | 49.92 | 45.15 | 42.52 | 41.65 |
| % IR | 15.01 | 25.99 | 14.17 | 14.66 | 19.73 | 14.87 | 15.06 | 21.4 |
| % TSET | 40.07 | 48.32 | 37.79 | 38.35 | 43.96 | 38.81 | 38.79 | 44.03 |
| Dominant Wavelength | 496.2 | 494.8 | 510.5 | 511.7 | 494.4 | 505.2 | 506.2 | 507.7 |
| % Excitation Purity | 5.4 | 4.2 | 3.5 | 3.4 | 5.1 | 3.7 | 3.7 | 2.9 |
| Chromaticity Coor. x | 0.2944 | 0.2981 | 0.2996 | 0.3002 | 0.2955 | 0.2988 | 0.2988 | 0.3010 |
| Chromaticity Coor y | 0.3303 | 0.3200 | 0.3319 | 0.3318 | 0.3205 | 0.3289 | 0.3297 | 0.3275 |
| Most Preferred Embodiment of Invention Spectral Properties @ indicated thickness | | | | | | | | |
| Thickness in mm. | 4.1 | 5.7 | 3.6 | 3.85 | 4.8 | 3.85 | 3.85 | 4.7 |
| % LTA | 70.5 | 70.2 | 70.7 | 70 | 70.4 | 70.27 | 70.28 | 70.3 |
| % UV | 52.4 | 34.8 | 46.4 | 45.6 | 45.59 | 46.14 | 43.54 | 37.4 |
| % IR | 14.4 | 16 | 18.46 | 15.64 | 14.79 | 15.86 | 16.05 | 16.9 |
| % TSET | 39.6 | 40 | 40 | 39.28 | 39.62 | 39.74 | 39.72 | 39.9 |
| Dominant Wavelength | 496.2 | 494.7 | 510.5 | 511.7 | 494.4 | 505.2 | 506.2 | 507.6 |
| % Excitation Purity | 5.6 | 5.9 | 3.2 | 3.3 | 6.1 | 3.6 | 3.6 | 3.3 |

*pounds per 1000 pounds sand

Table VIII below indicates the improvements that can be achieved in ultra violet absorption that cerium oxide and titanium dioxide make when used in combination. Table VIII further demonstrates the effect that manganese dioxide has on the ultra violet absorption.

another advantage to lower salt cake because that allows less anthracite coal to be used and therefore providing commercial advantages. There is a tramp amount of titanium dioxide in commercial sand sources that adds about 0.01 to 0.05

TABLE VIII

|  | Example | | | | | | |
| --- | --- | --- | --- | --- | --- | --- | --- |
|  | 32 | 33 | 34 | 35 | 36 | 37 | 38 |
| Wt. % $Fe_2O_3$ | 0.5 | 0.5 | 0.5 | 0.5 | 0.5 | 0.5 | 0.5 |
| Wt. % FeO | 0.234 | 0.271 | 0.237 | 0.283 | 0.285 | 0.272 | 0.29 |
| Redox Ratio | 0.468 | 0.542 | 0.474 | 0.566 | 0.570 | 0.544 | 0.580 |
| Wt. % $MnO_2$ | 0.2 | 0.45 | 0.2 | 0.45 | 0.45 | 0.45 | 0.06 |
| Wt % $CeO_2$ | 0.2 | 0.1 | 0.4 | 0.25 | 0.25 | 0.25 | 0.5 |
| Wt. % $TiO_2$ | 0.6 | 0.5 | 0.4 | 0.25 | 0.25 | 0.25 | 0.1 |
| Salt Cake* | 10 | 10.5 | 10 | 10.5 | 10.5 | 10.5 | 10.5 |
| anthracite coal* | 1.903 | 2.096 | 1.903 | 2.107 | 2.336 | 2.1 | 2.106 |
| Spectral Properties @ 4.0 mm. control thickness | | | | | | | |
| % LTA | 73.8 | 71.14 | 73.67 | 71.16 | 71.16 | 72.3 | 71.09 |
| % UV | 40.04 | 39.77 | 40.69 | 43.32 | 42.4 | 43.43 | 43.53 |
| % IR | 21.37 | 17.23 | 20.97 | 15.97 | 15.86 | 17.14 | 15.36 |
| % TSET | 44.45 | 40.89 | 44.39 | 40.42 | 40.37 | 41.76 | 40.22 |
| Dominant Wavelength | 501 | 499.3 | 496.2 | 496.1 | 496 | 494.2 | 494.2 |
| % Excitation Purity | 3.5 | 4.4 | 4.5 | 5.4 | 5.4 | 5.8 | 7.1 |
| Chromaticity Coor. x | 0.2994 | 0.2968 | 0.2970 | 0.2945 | 0.2944 | 0.2936 | 0.2932 |
| Chromaticity Coor. y | 0.3249 | 0.3253 | 0.3219 | 0.3229 | 0.3228 | 0.3207 | 0.3208 |
| Most Preferred Embodiment of Invention Spectral Properties @ indicated thickness | | | | | | | |
| Thickness in mm. | 5 | 4.2 | 4.8 | 4.2 | 4.2 | 4.6 | 4.2 |
| % LTA | 70 | 70.3 | 70.6 | 70.4 | 70.3 | 70 | 70.3 |
| % UV | 34.77 | 38.6 | 36.74 | 41.2 | 41.4 | 40.4 | 42.6 |
| % IR | 15.17 | 16 | 15.88 | 14.8 | 14.7 | 13.7 | 14.3 |
| % TSET | 39.01 | 39.9 | 39.99 | 39.1 | 39.4 | 38.6 | 39 |
| Dominant Wavelength | 500.9 | 499.3 | 496.1 | 496.1 | 496 | 494.2 | 494.2 |
| % Excitation Purity | 4.4 | 4.7 | 5.3 | 5.7 | 5.2 | 6.6 | 6.3 |

*pounds per 1000 pounds sand

Table IX shows that MELITE, fly ash from coal burning furnaces marketed by the Calumite Company can substitute for a portion of the anthracite coal and acts as a reductant. Low salt cake is desirable because excess salt cake can contribute to $SO_x$ emissions from the furnace. There is wt. % TiO2 to any of the glass compositions. Note the similarities in spectral properties of the preferred embodiments of Example 39 with cerium oxide to those of Example 44 with titanium dioxide. The two examples have nominally the same spectral properties at different thickness.

TABLE IX

|  | Example | | | | | |
| --- | --- | --- | --- | --- | --- | --- |
|  | 39 | 40 | 41 | 42 | 43 | 44 |
| Wt. % $Fe_2O_3$ | 0.5 | 0.45 | 0.45 | 0.45 | 0.45 | 0.45 |
| Wt. % FeO | 0.318 | 0.241 | 0.251 | 0.247 | 0.235 | 0.268 |
| Redox Ratio | 0.636 | 0.536 | 0.558 | 0.549 | 0.522 | 0.596 |
| Wt. % $MnO_2$ | 0.1 | 0.15 | 0.15 | 0.15 | 0.15 | 0.15 |
| Wt. % $CeO_2$ | 0.3 | | | | | |
| Wt. % $TiO_2$ | | 0.4 | 0.4 | 0.4 | 0.4 | 0.4 |
| Salt Cake.* | 10.5 | 2.5 | 2.502 | 7.5 | 7.5 | 7.5 |
| anthracite coal* | 1.754 | 1.3 | 1.604 | 1.702 | 1.802 | 1.904 |
| Melite* | 34.3 | | | | | |
| Spectral Properties @ 4.0 mm. control thickness | | | | | | |
| % LTA | 67.83 | 74.74 | 73.69 | 73.96 | 74.23 | 71.72 |
| % UV | 41.98 | 53.79 | 52.89 | 52.8 | 52.94 | 48.83 |
| % IR | 13.13 | 20.59 | 19.31 | 19.76 | 21.1 | 17.5 |
| % TSET | 37.04 | 45.15 | 43.86 | 44.26 | 45.16 | 41.48 |

TABLE IX-continued

| | Example | | | | | |
|---|---|---|---|---|---|---|
| | 39 | 40 | 41 | 42 | 43 | 44 |
| Dominant Wavelength | 501 | 494.2 | 494.7 | 494.4 | 494.1 | 502.7 |
| % Excitation Purity | 4.7 | 5 | 5.1 | 5.1 | 5 | 3.7 |
| Chromaticity Coor. x | 0.29586 | 0.29596 | 0.28553 | 0.29557 | 0.29593 | 0.29885 |
| Chromaticity Coor. y | 0.32785 | 0.32012 | 0.3208 | 0.32051 | 0.31998 | 0.32686 |
| Most Preferred Embodiment of Invention Spectral Properties @ indicated thickness | | | | | | |
| Thickness in mm. | 3.6 | 5 | 4.8 | 5 | 5 | 4.4 |
| % LTA | 70 | 71.13 | 70.64 | 70.21 | 70.52 | 70 |
| % UV | 44.3 | 48.67 | 48.64 | 47.58 | 47.78 | 46.5 |
| % IR | 15.7 | 14.5 | 14.41 | 13.79 | 14.94 | 15.2 |
| % TSET | 39.5 | 39.91 | 39.56 | 39.01 | 39.84 | 39.3 |
| Dominant Wavelength | 501 | 494.2 | 494.6 | 494.4 | 494.1 | 502.7 |
| % Excitation Purity | 4.2 | 6.2 | 6.1 | 6.3 | 6.2 | 4 |

*pounds per 1000 pounds sand

Table X demonstrates the effect of increasing anthracite coal (CARBOCITE) and maintaining the other components constant. The stepped infrared absorption improvement is readily shown in Examples 45 through 52 as well as the effect that CARBOCITE has to lower the visible transmittance and increase the ultra violet transmittance.

All of the examples are made using the batch only with no cullet (the broken pieces of glass that are added to the batch feed in production). There are two types of cullet that can be added to the batch to produce glass of the invention: reduced iron glass from glass of the invention and oxidized iron glass. The reduced iron glass cullet has a redox ratio of about

TABLE X

| | Example | | | | | | | |
|---|---|---|---|---|---|---|---|---|
| | 45 | 46 | 47 | 48 | 49 | 50 | 51 | 52 |
| Wt. % $Fe_2O_3$ | 0.45 | 0.45 | 0.45 | 0.45 | 0.45 | 0.45 | 0.45 | 0.45 |
| Wt. % FeO | 0.168 | 0.188 | 0.186 | 0.199 | 0.216 | 0.231 | 0.25 | 0.255 |
| Redox Ratio | 0.373 | 0.418 | 0.413 | 0.442 | 0.480 | 0.513 | 0.556 | 0.567 |
| Wt. % $MnO_2$ | 0.15 | 0.15 | 0.15 | 0.15 | 0.15 | 0.15 | 0.15 | 0.15 |
| Wt. % $TiO_2$ | 0.4 | 0.4 | 0.4 | 0.4 | 0.4 | 0.4 | 0.4 | 0.4 |
| Salt Cake* | 5.007 | 5 | 5.003 | 5.004 | 5 | 5.002 | 5 | 5 |
| anthracite coal* | 0.9 | 1.104 | 1.2 | 1.303 | 1.4 | 1.5 | 1.601 | 1.704 |
| Spectral Properties @ 4.0 mm. control thickness | | | | | | | | |
| % LTA | 77.65 | 76.7 | 77.13 | 76.1 | 75.5 | 74.54 | 73.25 | 72.93 |
| % UV | 49.06 | 50.06 | 52.06 | 51.84 | 52.85 | 52.2 | 51.36 | 51.03 |
| % IR | 31.65 | 28.03 | 28.47 | 26.23 | 23.76 | 21.72 | 19.45 | 18.86 |
| % TSET | 52.21 | 49.91 | 50.46 | 48.79 | 47.22 | 45.63 | 43.73 | 43.13 |
| Dominant Wavelength | 499.6 | 497.3 | 496.5 | 495.4 | 494.5 | 494.4 | 494.7 | 496.7 |
| % Excitation Purity | 2.8 | 3.4 | 3.5 | 3.9 | 4.4 | 4.8 | 5 | 4.5 |
| Chromaticity Coor. x | 0.30168 | 0.30004 | 0.29995 | 0.29876 | 0.29915 | 0.29657 | 0.29587 | 0.29685 |
| Chromaticity Coor. y | 0.32225 | 0.32154 | 0.32091 | 0.3205 | 0.32325 | 0.32016 | 0.32075 | 0.32259 |
| Most Preferred Embodiment of Invention Spectral Properties @ indicated thickness | | | | | | | | |
| Thickness in mm. | | 6 | 6.2 | 5.8 | 5.6 | 5.2 | 4.8 | 4.6 |
| % LTA | | 70.33 | 70.4 | 70.2 | 70.1 | 70.2 | 70.13 | 70.6 |
| % UV | | 40.36 | 41.8 | 43.2 | 45.1 | 46.1 | 47.06 | 47.7 |
| % IR | | 16.01 | 15.5 | 15.5 | 14.5 | 14.6 | 14.54 | 15.2 |
| % TSET | | 39.98 | 39.8 | 39.8 | 39.3 | 39.5 | 39.39 | 39.9 |
| Dominant Wavelength | | 497.2 | 496.3 | 495.3 | 494.5 | 494.3 | 494.7 | 496.7 |
| % Excitation Purity | | 5.1 | 5.4 | 5.6 | 6.1 | 6.3 | 5.9 | 5.2 |

*pounds per 1000 pounds sand 0.5 to 0.6 while the oxidized iron glass has a redox ratio of about 0.25. The redox ratio is defined as the ratio of wt. % FeO/total Fe as wt. % $Fe_2O_3$. For example, if the desired glass of the invention in the examples above uses 2 pounds of anthracite coal for 1000 pounds of sand, then an additional 1.5 pounds of anthracite coal must be added to the batch when the reduced iron glass cullet is added to make 50% of the batch feed to the furnace for a total of 3.5 pounds of anthracite coal per 1000 pounds of sand. For other cullet levels, the anthracite coal is increased or decreased proportionately. If the oxidized iron glass cullet is used, more anthracite coal must be added to drive the oxidized cullet toward the reduced iron green color. For example, if the desired glass of the invention in the examples above uses 2 pounds of anthracite coal for 1000 pounds of sand, then an additional 2.5 pounds of anthracite coal must be added to the batch when the oxidized iron glass cullet is added to make 50% of the batch feed to the furnace for a total of 4.5 pounds of anthracite coal per 1000 pounds of sand.

ganese oxide also prevents excessive reduction of sulfate to form iron sulfide that is amber in color and will decrease the transmittance of the glass.

Figure 2:
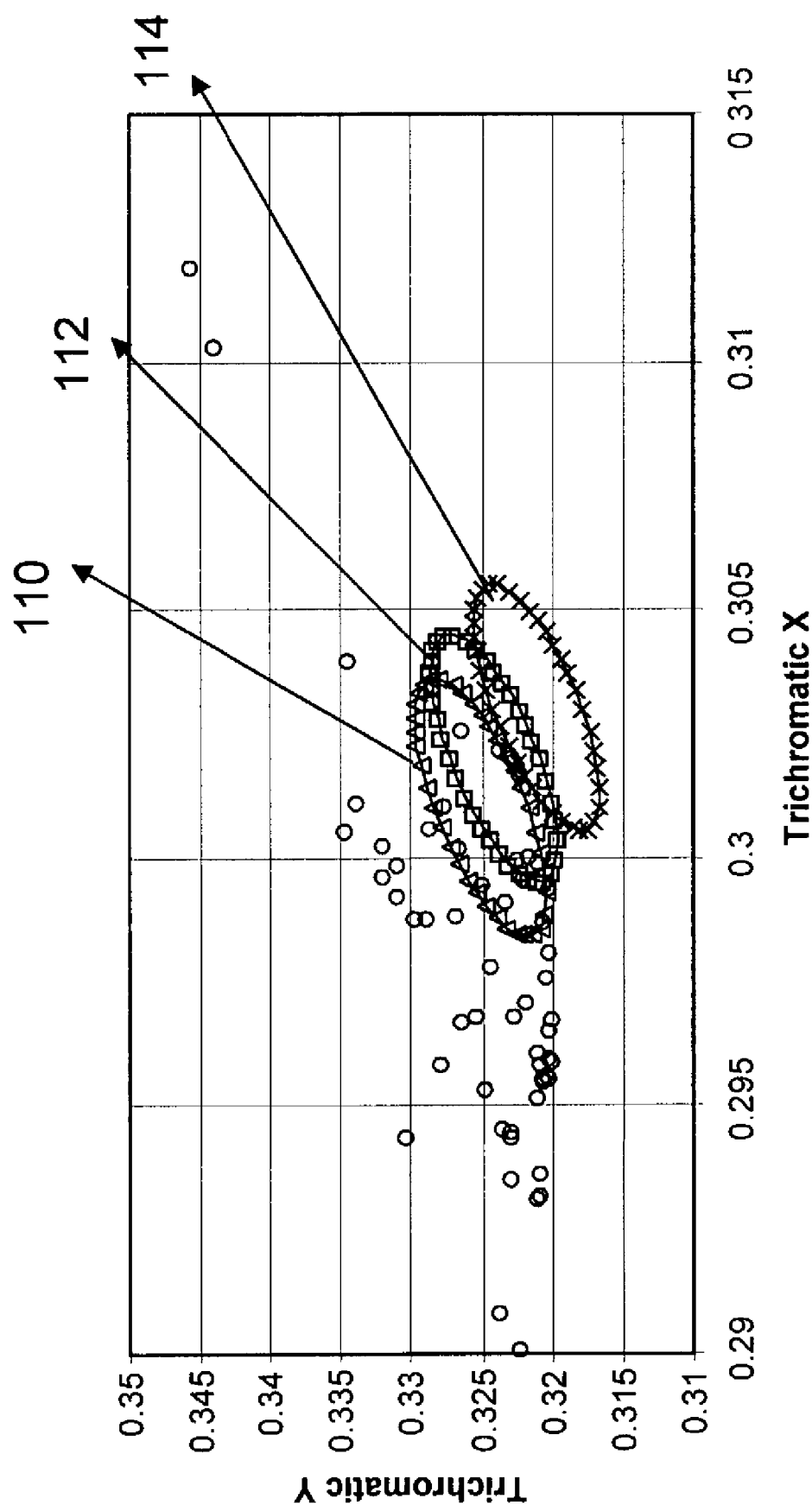
FIG. 2 is a graphical representation of the glass in prior art and the glass of the present invention.

FIG. 2 is a graphical representation of the chromatographic coordinates of the present glass shown by circles taken from the examples above when compared to the prior commercially available glass. As seen in the Figure, the glass of the present invention is greener than the glass in the prior available products represented by reference numerals 110, 112 and 114.

As any person skilled in the art will recognize from the previous description and from the figures and claims, modifications and changes can be made to the preferred embodiment of the invention without departing from the scope of the invention as defined in the following claims.

What is claimed is:

1. A colored glass for use in a motor vehicle having a base and a colorant, wherein composition of the colorant by weight of the colored glass consists essentially of:

TABLE XI

| | Example | | | | | | |
|---|---|---|---|---|---|---|---|
| | 53 | 54 | 55 | 56 | 57 | 58 | 59 |
| Wt. % $Fe_2O_3$ | 0.45 | 0.45 | 0.45 | 0.45 | 0.45 | 0.45 | 0.45 |
| Wt. % FeO | 0.173 | 0.195 | 0.222 | 0.244 | 0.178 | 0.182 | 0.208 |
| Redox Ratio | 0.384 | 0.433 | 0.493 | 0.542 | 0.396 | 0.404 | 0.462 |
| Wt. % $MnO_2$ | 0.15 | 0.15 | 0.15 | 0.15 | 0.15 | 0.15 | 0.15 |
| Wt. % $TiO_2$ | 0.3 | 0.3 | 0.4 | 0.4 | 0.5 | 0.5 | 0.5 |
| Salt Cake* | 5 | 5 | 5 | 5 | 5 | 5 | 5 |
| anthracite coal* | 1.008 | 1.251 | 1.501 | 1.703 | 1 | 1.112 | 1.252 |
| Spectral Properties @ 4.0 mm. control thickness | | | | | | | |
| % LTA | 77.41 | 75.03 | 75.2 | 73.58 | 76.32 | 75.96 | 74.92 |
| % UV | 53.47 | 51.89 | 52.86 | 52.22 | 49.32 | 49.01 | 49.59 |
| % IR | 30.8 | 26.83 | 22.88 | 20.08 | 29.9 | 29.1 | 24.88 |
| % TSET | 51.97 | 48.68 | 46.58 | 44.28 | 50.7 | 50.07 | 47.37 |
| Dominant Wavelength | 495.3 | 495.3 | 494.2 | 494.2 | 500.5 | 501 | 497.7 |
| % Excitation Purity | 3.4 | 3.7 | 4.7 | 5.1 | 2.7 | 2.7 | 3.5 |
| Chromaticity Coor. x | 0.30018 | 0.29942 | 0.29677 | 0.29559 | 0.30195 | 0.30202 | 0.29958 |
| Chromaticity Coor. y | 0.31986 | 0.32018 | 0.31993 | 0.32018 | 0.32259 | 0.32285 | 0.32209 |
| Most Preferred Embodiment of Invention Spectral Properties @ indicated thickness | | | | | | | |
| Thickness in mm. | | | | 4.8 | | | 5.4 |
| % LTA | | | | 70.51 | | | 70 |
| % UV | | | | 47.96 | | | 42.4 |
| % IR | | | | 15.08 | | | 16.4 |
| % TSET | | | | 39.94 | | | 40 |
| Dominant Wavelength | | | | 494.1 | | | 497.6 |
| % Excitation Purity | | | | 6.1 | | | 4.8 |

*pounds per 1000 pounds sand

Table XI above shows that the anthracite coal has the same affect as in Table X when titanium dioxide is added to the glass composition. Another important feature of the instant invention is that glass of the invention uses only 0.30 to 0.65 wt. % total iron oxide while the prior art green glass contains 0.5 to 0.95 wt. % total iron oxide.

As can be seen from the examples above, the glass in accordance with the present invention provides for high transmittance, an improved infrared light absorption and an improved ultra violet absorption. Further, the use of anthracite coal and magnesium dioxide shifts the iron oxide equilibrium towards the reduced form of iron (FeO). Man- 0.3 to 0.65 wt. % of total iron as $Fe_2O_3$, wherein ratio of FeO to total iron as $Fe_2O_3$ is in a range of 0.37 to 0.65;

0.05 to 0.8 wt. % of manganese oxide as $MnO_2$; and wherein the colored glass at 4 mm. control thickness has a light transmittance using illuminant A in a range of 65% to 81%, an infrared transmittance in the range of 10% to 32%, an ultraviolet transmittance in the range of 39% to 60%, an excitation purity in a range of 2% to 9%, and a dominant wavelength using illuminant C in a range of 494 to 555 nanometers.

2. The colored glass of claim 1, wherein the colorant further comprises up to 1 wt. % titanium oxide as $TiO_2$.

3. The colored glass of claim 2, wherein the amount of titanium oxide is in the range of 0.3 to 0.6 wt. %.

4. The colored glass of claim 1, wherein the colorant further comprises up to 1 wt. % cerium oxide as $CeO_2$.

5. The colored glass of claim 4, wherein the amount of cerium oxide is in the range of 0.2 to 0.5 wt. %.

6. The colored glass of claim 1, wherein the amount of total iron expressed as $Fe_2O_3$ is in the range of 0.4 to 0.6 wt. %.

7. The colored glass of claim 1, wherein the amount of manganese oxide as $MnO_2$ is in the range of 0.1 to 0.3 wt. %.

8. A colored glass for use in a motor vehicle having a base and a colorant, wherein composition of the colorant by weight of the colored glass comprising:
- 0.3 to 0.65 wt. % of total iron as $Fe_2O_3$, wherein ratio of FeO to total iron as $Fe_2O_3$ is in a range of 0.37 to 0.65;
- 0.05 to 0.8 wt. % of manganese oxide as $MnO_2$; and
- wherein the colored glass at 4 mm. control thickness has a light transmittance using illuminant A in a range of 65% to 81%, an infrared transmittance in the range of 10% to 32%, an ultraviolet transmittance in the range of 39% to 60%, an excitation purity in a range of 2% to 9%, and a dominant wavelength using illuminant C in a range of 494 to 555 nanometers;
- wherein a color of the colored glass is defined by a chromatography coordinates inside the polygon ABCDA, wherein the chromaticity coordinates are:

|   | x | y |
|---|---|---|
| A | 0.284 | 0.321 |
| B | 0.301 | 0.317 |
| C | 0.307 | 0.326 |
| D | 0.314 | 0.352 | and the polygon ABCDA represent the full scope of the color space of the present invention.

9. The colored glass of claim 8, wherein the preferred chromaticity coordinates inside the polygon ABCDA are:

|   | x | y |
|---|---|---|
| A | 0.3 | 0.319 |
| B | 0.293 | 0.325 |
| C | 0.305 | 0.338 |
| D | 0.304 | 0.325 | and the smaller polygon ABCDA represents the preferred color space of the present invention.

10. The colored glass of claim 8, wherein the color defined inside the polygon ABCDA is green.

11. The colored glass of claim 1, wherein the dominant wavelength in the range of 496 to 520 nanometers.

12. The colored glass of claim 1, wherein the composition of the base by weight of the colored glass is:
- 68 to 75 wt. % $SiO_2$;
- 10 to 18 wt. % $Na_2O$;
- 5 to 15 wt. % CaO;
- 0 to 10 wt. % MgO;
- 0 to 5 wt. % $Al_2O_3$; and
- 0 to 5 wt. % $K_2O$;
- wherein the total amount of CaO and MgO is in a range of 6 to 15 wt. % and the total amount of $Na_2O$ and $K_2O$ is in a range of 10 to 20 wt. %.

* * * * *